(12) United States Patent
Weller et al.

(10) Patent No.: US 9,780,627 B2
(45) Date of Patent: Oct. 3, 2017

(54) ELECTRIC MOTOR HAVING A STATOR AND A ROTOR

(71) Applicant: Robert Bosch GmbH, Stuttgart, DE (US)

(72) Inventors: Friedbert Weller, Filderstadt (DE); Peter Nadig, Goennheim (DE); Klaus Dengler, Kornwestheim (DE); Daniel Rombach, Metzingen (DE); Bastian Kloer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 14/257,332

(22) Filed: Apr. 21, 2014

(65) Prior Publication Data

US 2014/0319938 A1 Oct. 30, 2014

(30) Foreign Application Priority Data

Apr. 30, 2013 (DE) ........................ 10 2013 207 876

(51) Int. Cl.
| | |
|---|---|
| *H02K 11/00* | (2016.01) |
| *H02K 1/27* | (2006.01) |
| *H02K 1/30* | (2006.01) |
| *H02K 7/04* | (2006.01) |
| *H02K 11/215* | (2016.01) |
| *H02K 7/14* | (2006.01) |

(52) U.S. Cl.
CPC ........... *H02K 11/0021* (2013.01); *H02K 1/27* (2013.01); *H02K 1/30* (2013.01); *H02K 7/04* (2013.01); *H02K 11/215* (2016.01); *H02K 7/145* (2013.01)

(58) Field of Classification Search
CPC ........ H02K 1/27; H02K 1/30; H02K 11/0021; H02K 7/04
USPC .................................. 310/68 B, 50, 216.117
See application file for complete search history.

(56) References Cited

U.S. PATENT DOCUMENTS

| | | | | |
|---|---|---|---|---|
| 4,471,652 A | * | 9/1984 | Yasuhara | ................ G01P 3/487 310/168 |
| 4,578,605 A | * | 3/1986 | Reinhardt | ............... F04D 27/00 310/67 R |
| 4,674,264 A | * | 6/1987 | Ellis | ...................... B65B 7/2835 192/56.4 |
| 5,239,218 A | * | 8/1993 | Hashimoto | ............ H02K 37/18 310/267 |
| 5,872,408 A | * | 2/1999 | Rakov | .................. G01D 5/2412 310/168 |
| 6,144,131 A | * | 11/2000 | Hollenbeck | ............ H02K 1/276 310/156.53 |
| 6,242,826 B1 | * | 6/2001 | Saito | ...................... F16F 15/363 310/267 |
| 7,012,349 B1 | * | 3/2006 | Walker | ................... H02K 11/21 310/152 |

(Continued)

*Primary Examiner* — Naishadh Desai
(74) *Attorney, Agent, or Firm* — Maginot, Moore & Beck LLP

(57) ABSTRACT

An electric motor includes a stator, and a rotor which has a rotor shaft. At least one rotor position magnet is disposed on the rotor shaft, and is configured to provide a magnetic signal that can be evaluated, upon a rotation of the rotor shaft, at least for the purpose of determining a respective rotor position of the rotor. At least one carrier is disposed in a rotationally fixed manner on the rotor shaft, and is connected to the at least one rotor position magnet. The carrier includes at least one opening configured to compensate imbalance of the rotor.

17 Claims, 4 Drawing Sheets

(56) References Cited

U.S. PATENT DOCUMENTS

| | | | | |
|---|---|---|---|---|
| 7,271,514 B2* | 9/2007 | Suzuki | ............... | H02K 9/19 310/156.08 |
| 2007/0207044 A1* | 9/2007 | Nagamitsu | ......... | F04D 25/0613 417/354 |
| 2008/0272660 A1* | 11/2008 | Becker | ............ | F16D 1/0835 310/43 |
| 2010/0001719 A1* | 1/2010 | Kikuchi | ............ | H02K 11/0021 324/207.15 |
| 2013/0328439 A1* | 12/2013 | Okada | ............ | H02K 15/165 310/216.117 |

* cited by examiner

ELECTRIC MOTOR HAVING A STATOR AND A ROTOR

This application claims priority under 35 U.S.C. §119 to patent application no. DE 10 2013 207 876.5, filed on Apr. 30, 2013 in Germany, the disclosure of which is incorporated herein by reference in its entirety.

The present disclosure relates to an electric motor, having a stator, and having a rotor, which has a rotor shaft, disposed on which there is at least one rotor position magnet for providing a magnetic signal that can be evaluated, upon a rotation of the rotor shaft, at least for the purpose of determining a respective rotor position of the rotor.

BACKGROUND

Such electric motors, having a stator and a rotor, are known from the prior art, wherein the rotor has a rotor position magnet, realized in the manner of a magnet ring, for acquiring a rotational speed signal. This magnet is fastened to a rotor shaft of the rotor in a rotationally fixed manner. For the purpose of compensating imbalance of the rotor, material is removed from defined positions on the rotor, e.g. on the rotor position magnet.

A disadvantage of this prior art is that, as a result of removal of the material from the rotor position magnet, cracks may occur on the magnet, or parts of the magnet may drop off, owing to the brittleness of the magnetic material. Cracks that occur in such a manner may result in a reduction in the functional capability of the electric motor. Moreover, during such a removal of material, swarf may be produced, which has to be elaborately removed from the rotor.

SUMMARY

It is therefore an object of the disclosure to provide a new electric motor, having a stator and a rotor, with which imbalance compensation can be achieved in a simplified and operationally safe manner.

This problem is achieved by an electric motor, having a stator, and having a rotor, which has a rotor shaft, disposed on which there is at least one rotor position magnet for providing a magnetic signal that can be evaluated, upon a rotation of the rotor shaft, at least for the purpose of determining a respective rotor position of the rotor. Disposed in a rotationally fixed manner on the rotor shaft there is at least one carrier, to which the at least one rotor position magnet is connected. At least one opening, for compensating imbalance of the rotor, can be realized on the carrier.

The disclosure thus makes it possible to provide an electric motor with which imbalance compensation can be implemented in a simplified and operationally safe manner.

According to one embodiment, the carrier comprises a non-magnetically conducting material.

This makes it possible for swarf, produced during the imbalance compensation, to be removed in a simple and safe manner.

Preferably, the carrier comprises brass.

It is thus made possible to realize the opening in a simple manner, in particular by the removal of material, by use of a comparatively soft material for realizing the carrier.

Preferably, the carrier is realized, at least portionally, in the manner of a frame-type receiver, in which the rotor position magnet is disposed in a rotationally fixed manner.

The disclosure thus enables the rotor position magnet to be disposed on the carrier in a rapid and precise manner.

The rotor position magnet is preferably realized in the manner of a ring magnet.

The rotor position magnet can thus be disposed on the carrier in a simple and exact manner.

According to one embodiment, the at least one opening is realized by removal of material from the carrier.

It is thus made possible for the at least one opening to be realized in a rapid and uncomplicated manner.

Preferably, the at least one opening is realized by drilling, milling and/or cutting.

The opening can thus be realized in a simple manner.

Preferably, a plurality of openings, disposed in a circular manner, are realized on the carrier.

Excessive removal of material from a single position on the carrier can thus be prevented in a safe and reliable manner.

According to one embodiment, the carrier is fastened to the rotor shaft at least by form closure, and in particular by press fitting and/or shrink fitting.

The carrier can thus be fastened to the rotor shaft in a stable and robust manner.

Moreover, the problem stated at the outset is also solved by a hand power tool, which has an electric motor having a stator and a rotor, wherein the rotor has a rotor shaft, disposed on which there is at least one rotor position magnet for providing a magnetic signal that can be evaluated, upon a rotation of the rotor shaft, at least for the purpose of determining a respective rotor position of the rotor. Disposed in a rotationally fixed manner on the rotor shaft there is at least one carrier, to which the at least one rotor position magnet is connected, wherein at least one opening, for compensating imbalance of the rotor, can be realized on the carrier.

BRIEF DESCRIPTION OF THE DRAWINGS

The disclosure is explained in greater detail in the description that follows, on the basis of exemplary embodiments represented in the drawings, wherein.

DETAILED DESCRIPTION

Figure 1:
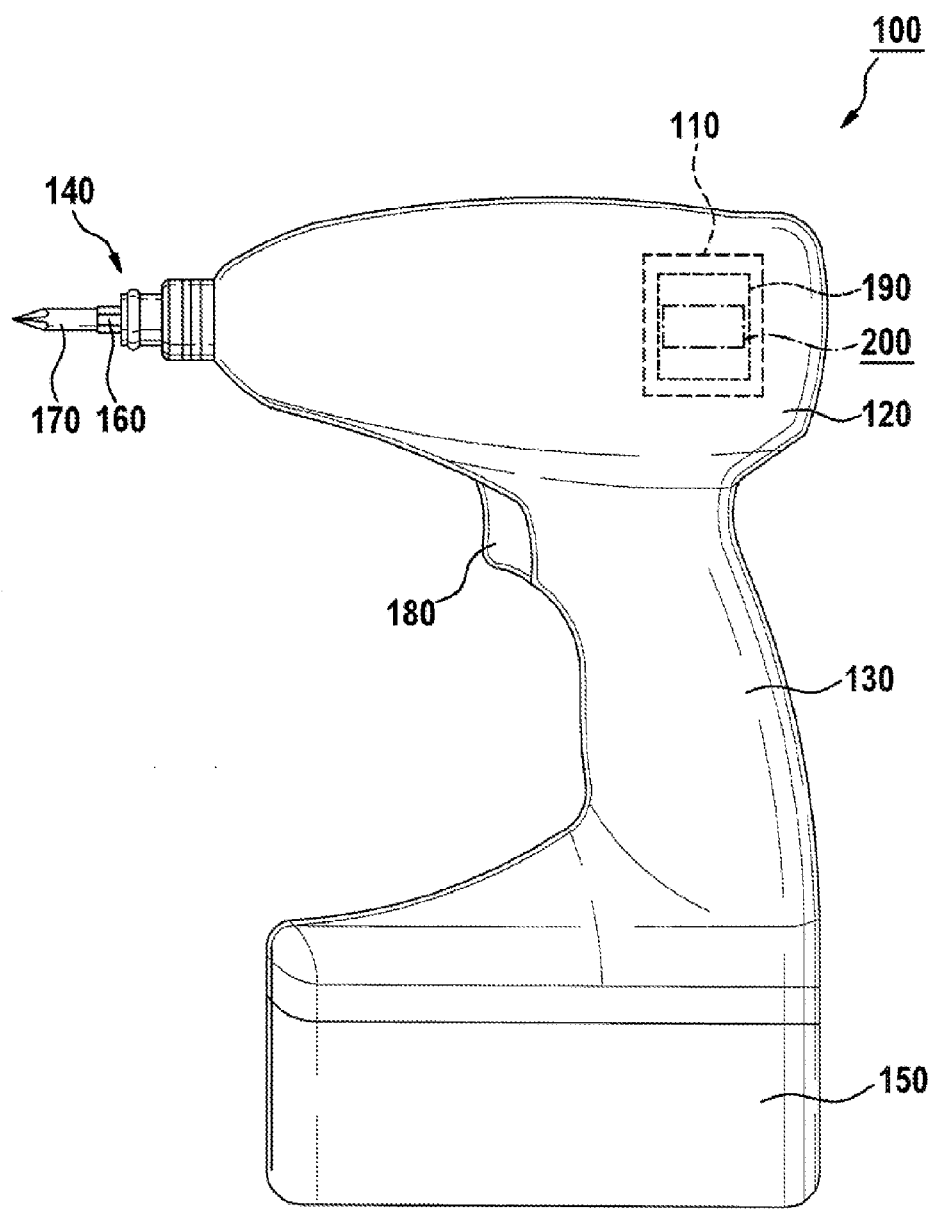
FIG. 1 shows a schematic view of a hand power tool, having an electric motor, which has a rotor according to one embodiment.

FIG. 1 shows an exemplary hand power tool 100, having an electric motor 110 according to one embodiment. By way of illustration, the hand power tool 100 has a tool housing 120, having a handle 130 and a tool receiver 140, and, by way of example, is mechanically and electrically connected to a battery pack 150 for supplying electric power independently of a power supply network.

Here, by way of example, the hand power tool 100 is realized as a battery-powered screwdriver. It is pointed out, however, that the present disclosure is not limited to battery-powered screwdrivers but, rather, may be applied with various electric tools in which the electric motor 110 may be used, e.g. in the case of a rotary hammer, a screwdriver, a drill/driver, a percussion drill, a saw, a milling machine, a sander, a garden tool, etc., irrespective of whether the electric tool can be operated independently of the power supply network, with the battery pack 150, or in dependence on a power supply network.

By way of example, the electric motor 110, which is supplied with electric current by the battery pack 150, is disposed in the tool housing 120. By way of illustration, this electric motor is realized in the manner of an internal-rotor motor, having an inner rotor 200 and an outer stator 190, but, as an alternative to this, may also be realized in the manner of an external-rotor motor. The electric motor 110 may be actuated, i.e. switched on and off, by means of, for example, a hand switch 180, and may be realized, for example, as an electronically commutated motor or as a brush motor or commutator motor. Preferably, the electric motor 110 can be electronically controlled by open-loop or closed-loop control in such a manner that both a reversing operating mode and selections in respect of a desired rotational speed and/or a torque can be realized.

The tool receiver 140 is preferably realized to receive insert tools, and, according to one embodiment, can be connected both to an insert tool having an external coupling, e.g. a screwdriver bit, and to an insert too having an internal coupling, e.g. a socket wrench. By way of illustration, the tool receiver 140 can be connected to an insert tool 170 having an external polygonal coupling 160, or to an insert tool having an internal polygonal coupling. By way of example, the insert tool 170 is realized as a screwdriver bit having the external polygonal coupling 160 realized, by way of illustration, as a hexagonal coupling, which is disposed in the tool receiver 140. Such a screwdriver bit is sufficiently well known from the prior art, such that, to keep the description brief, there is no need for a detailed description here.

Figure 2:
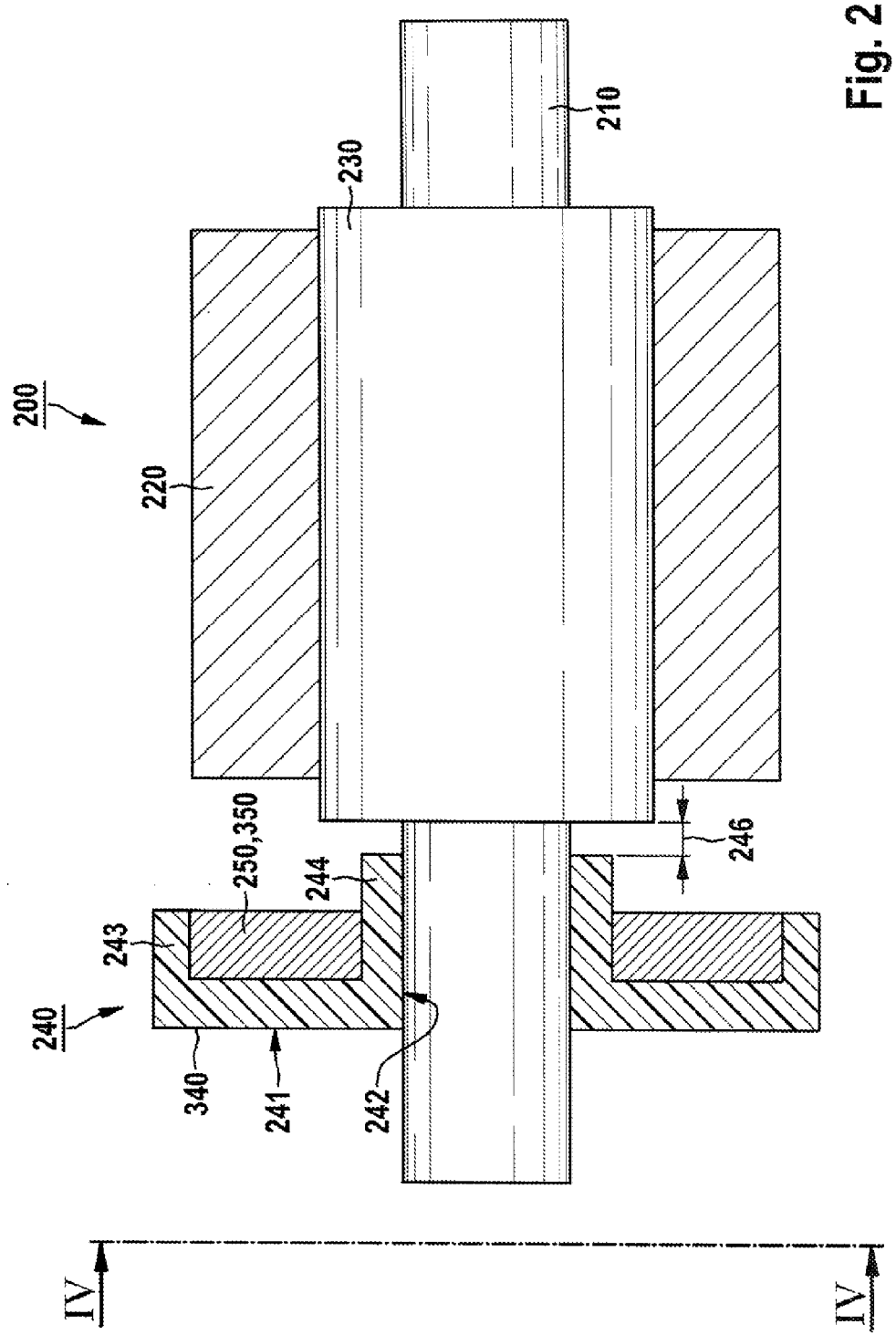
FIG. 2 shows a sectional view of the rotor from FIG. 1, according to one embodiment.

FIG. 2 shows the rotor 200 from FIG. 1, which, according to one embodiment, has a rotor shaft 210, which is provided with a rotor core 230 and a rotor magnet 220. The rotor shaft 210 is preferably made of steel, but may, however, also comprise or be made of any other material. By way of illustration, the rotor magnet 220 is a hollow-cylinder permanent magnet, which is preferably realized in the manner of a ring magnet. However, the rotor magnet 220 may also be realized as a segmented shell-type magnet, as a cuboidal magnet, or in any other form.

According to one embodiment, at least one carrier 240, which, by way of illustration, is provided with a reach-through opening 242, is disposed in a rotationally fixed manner on the rotor shaft 210, in the region of an axial end of the rotor 200. This carrier 240 is fastened to the rotor shaft 210 at least by means of a form-closed connection, and preferably fixed to the rotor shaft 210 by a force-closed connection, e.g. by a press fit and/or a shrink fit. At least one rotor position magnet 250 is connected to the carrier 240, e.g. by adhesive bonding.

Preferably, the carrier 240 comprises at least one non-magnetically conducting, and preferably comparatively soft, material, e.g. brass. According to one embodiment, at least one opening (260 in FIG. 4) can be realized on the carrier 240 for the purpose of compensating imbalance of the rotor 200, as described below for FIG. 4.

Furthermore, the carrier 240 is preferably realized, at least portionally, in the manner of a frame-type receiver 340, in which the rotor position magnet 250 is disposed in a rotationally fixed manner, e.g. by means of adhesive bonding or expansion fitting. The rotor position magnet 250 serves to provide a magnetic signal, which can be evaluated, upon a rotation of the rotor shaft 210, at least for the purpose of determining a respective rotor position of the rotor 200.

The rotor position magnet 250 is illustrated, by way of example, in the form of a hollow-cylinder magnet, which is preferably realized in the manner of a ring magnet 350. However, the rotor position magnet 250 may also be realized in any other form.

By way of illustration, the frame-type receiver 340 has a ring-shaped basic body 241, having a circumferential web 243 and a spacer element 244. By way of illustration, the frame-type receiver 340, or the carrier 240, is spaced apart from the rotor 200, as indicated by a double arrow 246. It is pointed out, however, that it is not absolutely necessary for the carrier 240, or the frame-type receiver 340, to be spaced apart in such a manner, as described below for FIG. 3.

Figure 3:
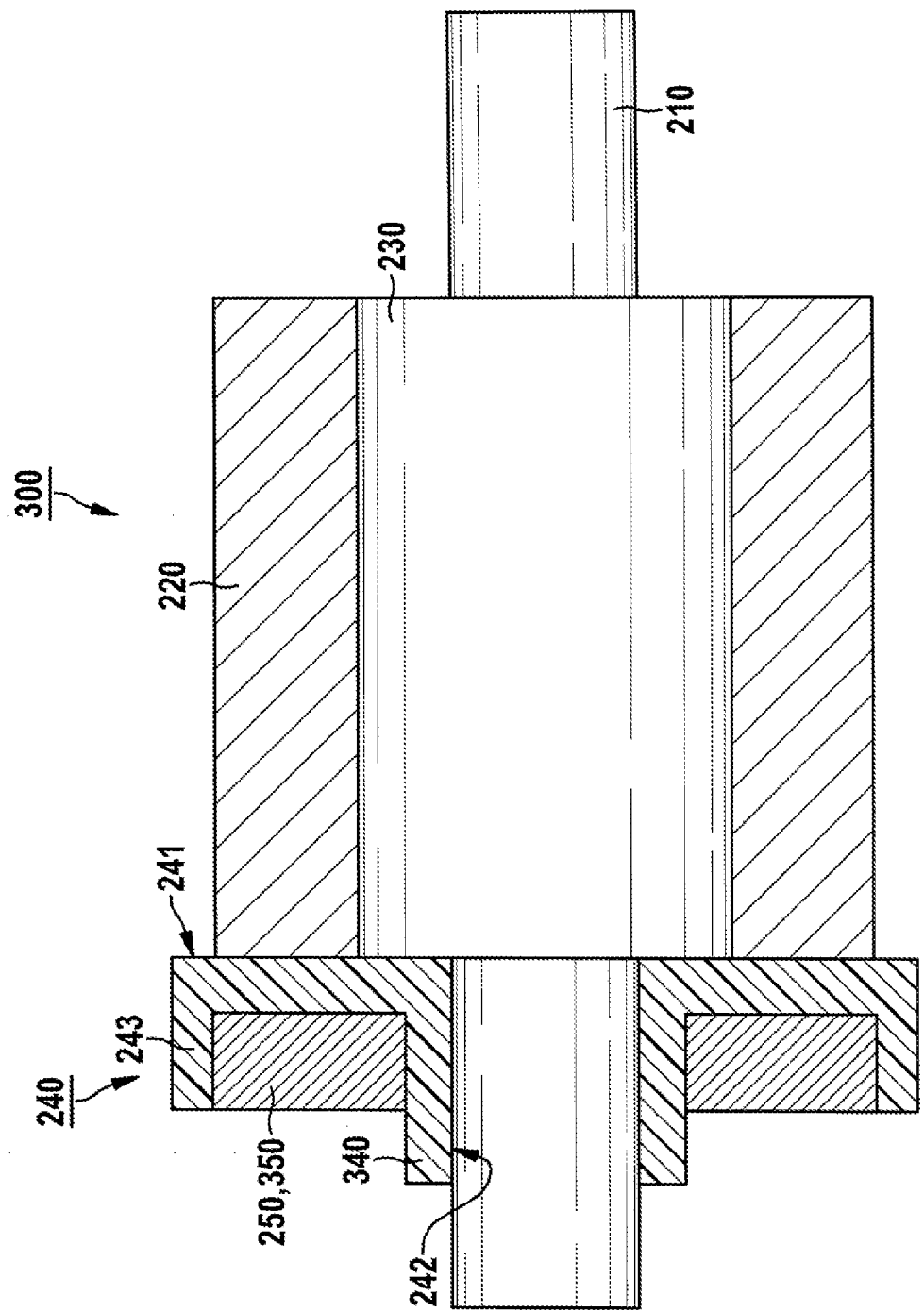
FIG. 3 shows a sectional view of a rotor according to a further embodiment, with which the rotor from FIG. 1 may be realized.

FIG. 3 shows a rotor 300 according to a further embodiment, with which the rotor 200 from FIG. 1 may be realized. In the case of the rotor 300, the carrier 240, or the frame-type receiver 340, is disposed on the rotor shaft 210 after having been turned by 180 degrees, by way of example, and in this case, by way of illustration, is disposed with the ring-shaped basic body 241 bearing directly against the rotor core 230. As an alternative to this, the carrier 240 may also be spaced apart from the rotor core 230.

Figure 4:
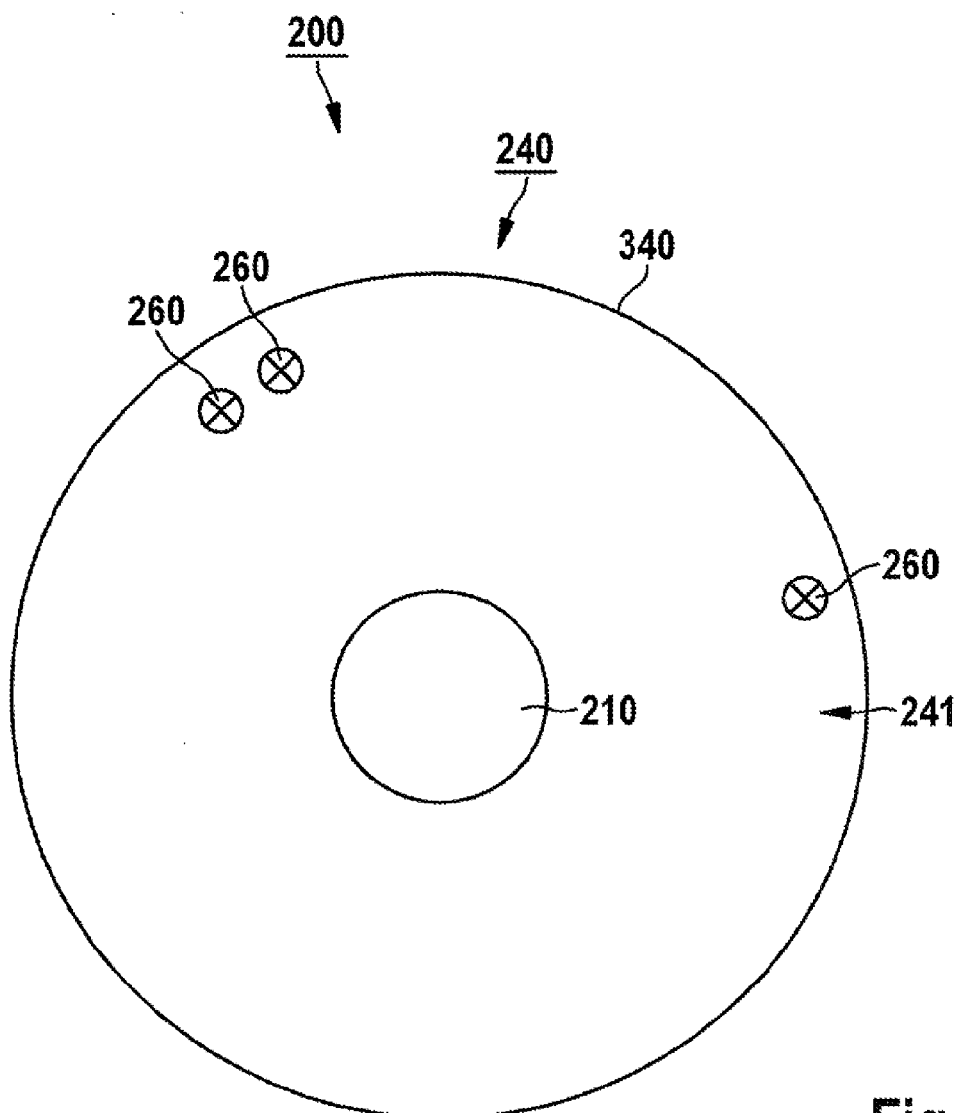
FIG. 4 shows a plan view of the rotor from FIGS. 1 and 2, as viewed in the direction of arrows IV from FIG. 2.

FIG. 4 shows the rotor 200 from FIG. 2, with the carrier 240, in the case of an exemplary imbalance compensation. In this case, according to one embodiment, at least one opening 260 is realized on the carrier 240 by removal of material, e.g. by drilling, milling and/or cutting. By way of example, the opening 260 is realized in the manner of a blind drilled hole. Furthermore, the opening 260 may also be realized in the form of a longitudinal drilled hole.

It is pointed out that, in the context of the present disclosure, the realization of an opening is understood to mean any form of removal of material from the carrier 240. Accordingly, for example, grinding-off of an outer edge of the carrier 240 is also to be understood as a realization of an opening.

Preferably, a plurality of openings 260 are disposed on the carrier 240, so as not to weaken the structure and carrying capacity of the carrier 240. By way of illustration, three openings 260 are represented, disposed in a circular manner on the carrier 240. These openings may be disposed on the ring-shaped basic body 241 or, also, on the circumference of the carrier 240.

It is pointed out, however, that the realization of the three openings 260 arranged in a circular manner is merely exemplary, and is not to be understood as a limitation of the disclosure. Rather, any number of openings may be provided, which may be disposed in any manner on the carrier 240.

What is claimed is:

1. An electric motor, comprising:
a stator; and
a rotor assembly positioned relative to the stator, the rotor assembly including:
　a rotor that includes a rotor shaft,
　at least one rotor position magnet disposed on the rotor shaft, the at least one rotor position magnet providing a magnetic signal that is configured to be evaluated to determine a respective rotor position of the rotor upon a rotation of the rotor shaft, and
　at least one carrier disposed on the rotor shaft in a rotationally fixed manner, the at least one carrier including at least one opening configured to compensate an imbalance of the rotor assembly,
wherein the at least one carrier is connected to the at least one rotor position magnet, and wherein a position of the at least one opening is based on the imbalance of the rotor assembly.

2. The electric motor according to claim 1, wherein the at least one carrier further includes a non-magnetically conducting material.

3. The electric motor according to claim 1, wherein the at least one carrier further includes brass.

4. The electric motor according to claim 1, wherein:
a portion of the at least one carrier is configured as a frame-type receiver; and
the at least one rotor position magnet is disposed in the frame-type receiver portion in a rotationally fixed manner.

5. The electric motor according to claim 1, wherein the at least one rotor position magnet includes a ring magnet.

6. The electric motor according to claim 1, wherein the at least one opening is formed by a removal of material from the at least one carrier.

7. The electric motor according to claim 1, wherein the at least one opening is formed via at least one of drilling, milling, and cutting.

8. The electric motor according to claim 1, wherein the at least one carrier includes a plurality of openings disposed in a circular manner.

9. The electric motor according to claim 1, wherein the at least one carrier is fastened to the rotor shaft at least via form closure.

10. A hand power tool, comprising:
an electric motor that includes:
a stator, and
a rotor assembly positioned relative to the stator, the rotor assembly including:
a rotor that includes a rotor shaft,
at least one rotor position magnet disposed on the rotor shaft, the at least one rotor position magnet providing a magnetic signal that is configured to be evaluated to determine a respective rotor position of the rotor upon a rotation of the rotor shaft, and
at least one carrier disposed on the rotor shaft in a rotationally fixed manner, the at least one carrier including at least one opening configured to compensate an imbalance of the rotor assembly,
wherein the at least one rotor position magnet is connected to the at least one carrier, and
wherein a position of the at least one opening is based on the imbalance of the rotor assembly.

11. The electric motor according to claim 1, wherein the at least one opening is formed by a removal of material from the at least one carrier in an amount based on the imbalance of the rotor assembly.

12. The electric motor according to claim 1, wherein the at least one opening is formed via at least one of drilling, milling, and cutting so as to remove material from the at least one carrier in an amount based on the imbalance of the rotor assembly.

13. The electric motor according to claim 1, wherein the position of the at least one opening is infinitely variable across a surface portion of the at least one carrier.

14. The electric motor according to claim 13, wherein the surface portion is an end face of the at least one carrier, the end face oriented perpendicular to and completely encircling the rotor shaft.

15. The electric motor according to claim 13, wherein the surface portion is a continuous circumferential surface of the at least one carrier, the circumferential surface facing radially away from and completely encircling the rotor shaft.

16. The electric motor according to claim 4, wherein the frame-type receiver includes a ring-shaped basic body with a circumferential web and a spacer element extending axially from a central region of the basic body.

17. The electric motor according to claim 16, wherein the at least one rotor position magnet is disposed within a cavity formed by the basic body and the circumferential web, the at least one rotor position magnet disposed entirely within the cavity and surrounded circumferentially by the circumferential web.

* * * * *